United States Patent
Gantz et al.

(10) Patent No.: US 6,934,567 B2
(45) Date of Patent: Aug. 23, 2005

(54) PERSONAL WEARABLE COMMUNICATION AND SPEAKER SYSTEM

(75) Inventors: Christopher Carl Gantz, Northbrook, IL (US); Tai Hoon Kim Matlin, Round Lake Beach, IL (US)

(73) Assignee: Addax Sound Company, Northbrook, IL (US)

( * ) Notice: Subject to any disclaimer, the term of this patent is extended or adjusted under 35 U.S.C. 154(b) by 446 days.

(21) Appl. No.: 10/218,277

(22) Filed: Aug. 14, 2002

(65) Prior Publication Data

US 2004/0203506 A1 Oct. 14, 2004

(51) Int. Cl.⁷ .............................................. H04B 1/38
(52) U.S. Cl. .................... 455/575.2; 455/350; 379/430; 381/364
(58) Field of Search .................... 455/575.2, 569.1, 455/575.6, 575.1, 90.3, 350, 344; 379/430, 431; 381/364, 367, 151

(56) References Cited

U.S. PATENT DOCUMENTS

| | | | |
|---|---|---|---|
| 3,983,483 A | 9/1976 | Pando | 325/16 |
| 4,070,553 A | 1/1978 | Hass | 179/157 |
| 4,084,139 A | 4/1978 | Jakobe | 325/361 |
| 4,322,585 A | 3/1982 | Liautaud | 179/157 |
| 4,485,276 A | 11/1984 | Sato | 179/157 |
| 4,685,448 A * | 8/1987 | Shames et al. | 600/23 |
| 4,764,962 A | 8/1988 | Ekman et al. | 381/24 |
| 4,864,646 A | 9/1989 | Nesbit et al. | 455/344 |
| 5,212,734 A | 5/1993 | Tsao | 381/188 |
| 5,563,951 A | 10/1996 | Wang et al. | 381/24 |
| 5,617,477 A | 4/1997 | Boyden | 381/25 |
| 5,680,465 A | 10/1997 | Boyden | 381/25 |
| 5,682,434 A | 10/1997 | Boyden | 381/187 |
| 5,687,245 A | 11/1997 | Boyden | 381/187 |
| 5,701,356 A | 12/1997 | Stanford et al. | 381/187 |
| 5,757,929 A | 5/1998 | Wang et al. | 381/24 |
| 5,761,298 A | 6/1998 | Davis et al. | 379/430 |
| 5,815,579 A | 9/1998 | Boyden | 381/301 |
| 5,867,582 A | 2/1999 | Nagayoshi | 381/370 |
| 5,887,066 A | 3/1999 | Nakagawa | 381/311 |
| 5,956,630 A | 9/1999 | Mackey | 455/344 |
| 6,178,251 B1 | 1/2001 | Luchs et al. | 381/364 |
| 6,233,345 B1 | 5/2001 | Urwyler | 381/381 |
| 6,236,969 B1 | 5/2001 | Ruppert et al. | 704/275 |
| 6,252,970 B1 | 6/2001 | Poon et al. | 381/374 |
| 6,345,751 B1 | 2/2002 | Elliot | 224/646 |
| 2002/0173346 A1 | 11/2002 | Wang | 455/568 |

FOREIGN PATENT DOCUMENTS

DE 201 10 379 U1 4/2001

* cited by examiner

*Primary Examiner*—Nick Corsaro
(74) *Attorney, Agent, or Firm*—David I. Roche; Baker & McKenzie LLP

(57) ABSTRACT

A personal wearable communication and speaker entertainment system which provides improved quality audio response and which does not interfere with the wearer's activities or block environmental sounds is disclosed. The speaker system is connected to or in communication with a conventional source of audio signals, such as radio, tape player, CD player, cellular telephone or the like.

18 Claims, 4 Drawing Sheets

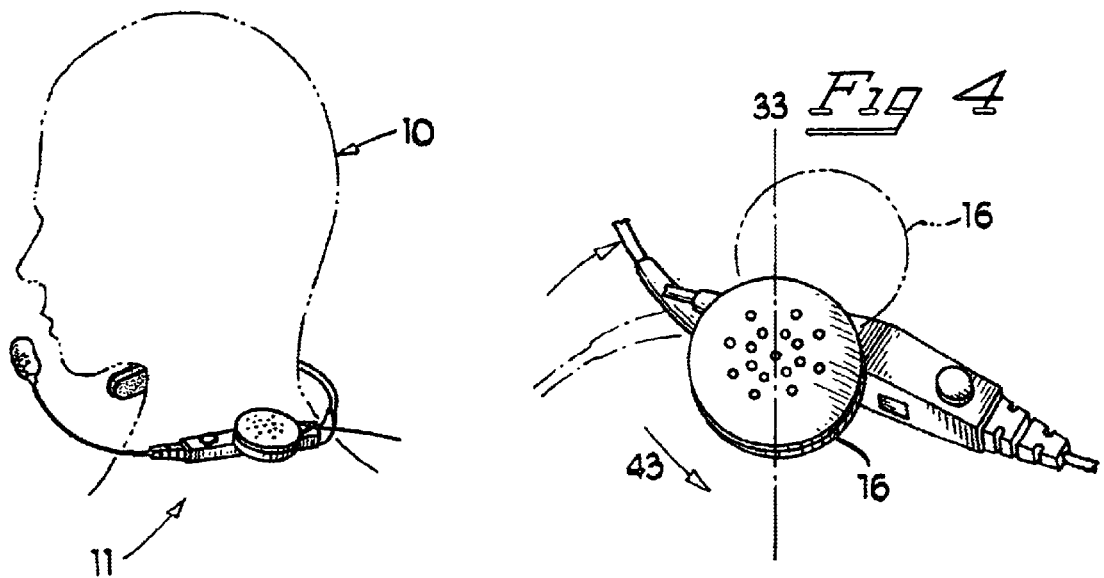
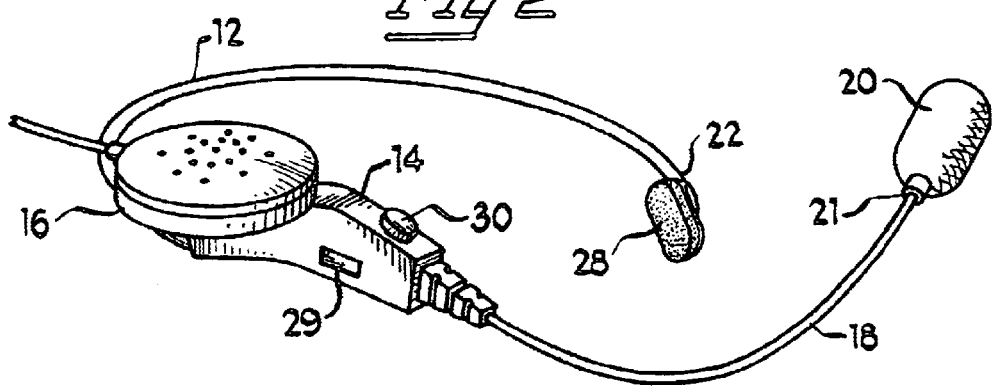
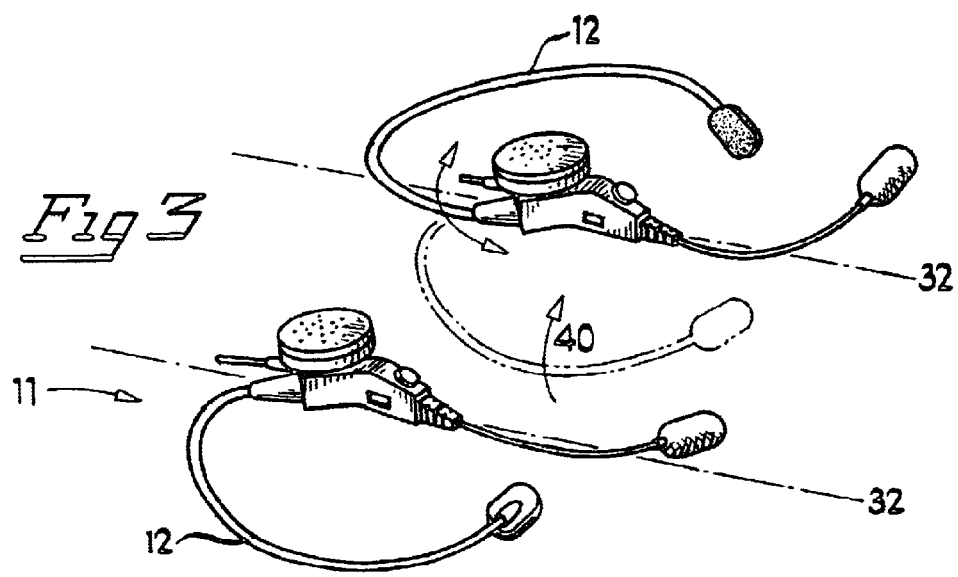

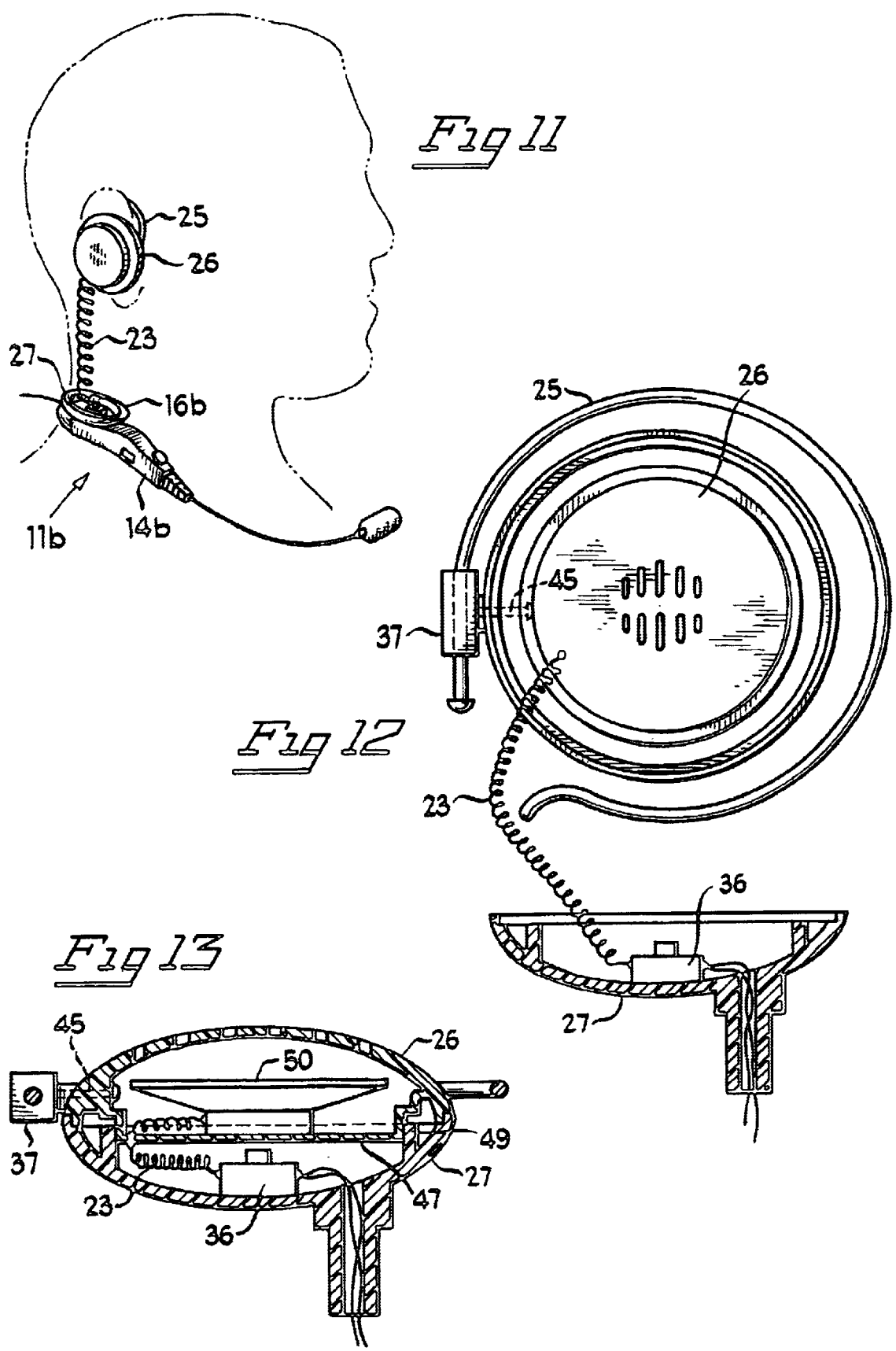

PERSONAL WEARABLE COMMUNICATION AND SPEAKER SYSTEM

BACKGROUND AND SUMMARY OF THE INVENTION

The present invention relates generally to hands-free communication devices, and more particularly to an alternative to headsets and earsets of the type used by persons engaged in telecommunications.

Presently, communication headset devices are used in a variety of applications. Such applications include use by telephone operators, radio operators, call center workers, customer service personnel, mobile phone users, multimedia users, and for other situations wherein it is desirable to the user to use both hands for things other than operation of communication system components. Accordingly, a wide variety of headsets and earsets are known in the prior art.

For example, headsets with boom microphones are common. These headsets typically have a resilient gripping band which extends over the top of the user's head. In such headsets the earphone is pressed against one of the user's ears by the distal end of the band contacting the user's head above the opposite ear. In other instances, two opposing earphones are used, in which the speaker is surrounded by padding which contacts the outer part of the user's ear, or miniature speakers extend into the ear canal of the user. In either case, at least some contact is made with the user's ear, and the user's head or scalp. Some headset users, especially users who wear such devices for extended periods of time, such as call-center agents, complain of head and/or ear discomfort.

Still other prior art devices eliminate the over-the-top head band, and instead attach a miniature speaker to the user's ear by use of an ear clip. In such devices, some effort is made to make an attachment device conform to the user's ear.

Known communications headsets and earsets can be broadly characterized on the basis of several fundamental aspects of their design and function, including, but not limited to the following: whether they employ an invasive ear tip or a non-invasive, but ear-contacting speaker in delivering audible information to the user; whether they deliver monaural or binaural sound; their acoustical characteristics; how they are physically supported on the user; and their ergonomic qualities.

Headsets and earsets which deliver binaural sound (i.e. ones which have acoustical transducers for both ears) may utilize some type of headband arrangement to secure receiver elements to each ear. Although generally providing very stable support for the headset, headbands have the disadvantages that they increase the size and weight of the headset, and tend to be uncomfortable and obtrusive to the user, especially when worn for extended periods of time. Headsets which deliver monaural sound (i.e. ones which have only a single receiver situated near one ear) may be either right-handed or left-handed, i.e., they incorporate a single design adaptable to either the left or right ear of the user. Monaural headsets may be implemented with either a headband supporting a single receiver element, or with an earhook that fits around the ear. Typical self-supporting earsets rely on either a clamping mechanism to grip the user's ear, or a dual point retention system using opposing leverage against the ear by a portion of the earhook itself. Uneven weight distribution can be a problem for earhook monaural headsets, since the majority of the weight is only on one side of the head. Furthermore, earhooks have the disadvantages that they increase the size and weight of the headset, and tend to be uncomfortable and obtrusive to the user.

Considerations in the design of communications headsets include the comfort of the device, the ease of putting the headset on and subsequently adjusting it for use, the stability of the retention, the restrictions on the user's mobility which result from the wearing of the device, as well as the quality of sound delivered by the device. Comfort, stability and durability of the communication headset device are believed to be among the most important considerations. Acoustical qualities are similarly of high importance, depending upon the application and the personal interests of the user. Acoustical quality of the sound heard by a user can be affected by interface between the speaker and ear, i.e., the nature and extent of any contact between the speaker housing and the user's ear. Invasive ear tips provide a good seal, but can lead to problems relating to comfort and cleanliness. Non-invasive loudspeaker-type receivers, on the other hand, are more susceptible to acoustical degradation from background-level sound and attenuation of the acoustical wave passing through open space from the receiver to the ear. Other acoustical problems arise from the arrangement and size of components in a headset. It is clearly desirable to utilize speakers and microphones of the smallest possible size and least weight. However, the acoustical sound of loudspeaker-type receivers must function at a high level of sound quality so that the smaller speakers can deliver a stronger and/or higher quality acoustical signal.

Further, it is well known that there are numerous differences in the physical characteristics of people in terms of the size, shape, and structure of the ear and the head, the position of the ear on the head, and other biometric concerns. Accordingly, conventional approaches to headset and earhook designs often result in a headset that is not comfortable or stable for significant numbers of users.

Thus, it is desirable to provide a wearable communication system that is comfortable and stable for a large number of users having varying physical characteristics, while providing high quality acoustic performance.

Furthermore, headset speakers are typically either in loudspeaker mode if it is a wearable personal communication device, not directly connected to the ear, or in headphone mode when the speaker is directly connected to the ear. Privacy and other considerations may force the user to chose to have the speaker directly connected to the ear. In this case, in one alternative embodiment, the user has the option of switching the neckset of the present invention from loudspeaker mode to headphone mode without sacrificing quality, sound, or comfort. Traditionally speakers have a single voice coil and can only have a single impedance and output rating. However, the present invention seeks to eliminate this limitation by including a feature that allows the speaker to switch from loudspeaker mode to headphone mode by utilizing two ratings and a dual voice coil.

In view of the limitations of the conventional headset and earset designs and communication systems, the present invention overcomes these limitations by providing a lightweight, self-supporting wearable communication device that can be comfortably and securely fitted to a wide range of users without undue individual customization. The wearable communication neckset of the present invention may be easily adjusted and fitted so as to be worn comfortably and in a firm and stable fashion around the neck, just at or above the shoulders, of a wearer. It has the advantage of not being in direct contact with the more sensitive areas of the body, such as the ear and head or scalp. The present invention includes an ergonomic alternative to a traditional headset or earset. The device of the present invention places a speaker and microphone combination on or near the intersection of user's neck and shoulder, thereby eliminating the need for any sort of contact with or mounting to the user's head or ear. The freedom of movement and rotation provided to the receiver enclosure by the attachment is an advantage in certain applications where user mobility is important.

Furthermore, an alternative embodiment of the present invention allows the user to place the speaker on the ear if so desired. By placing a dual voice coil cable and ear hook underneath the speaker, the user can easily disengage the speaker from its housing and attach it to their ear for more private conversations. In addition, the speaker can include a switch to change the output of the device from loudspeaker mode to headphone mode in order to eliminate the need to control the volume when the user temporarily (for momentary privacy concerns, for example) places the device onto the user's ear with the ear hook. The switch may be manual or the device may be configured to automatically switch to headphone mode when the ear hook is utilized.

BRIEF DESCRIPTION OF THE DRAWINGS

FIG. 1 is a perspective view of a user wearing a neckset of the present invention showing the position of the neckset on the user;

FIG. 2 is an enlarged perspective view of the neckset shown in FIG. 1;

FIG. 3 is a perspective view showing the transition of the neckset from a left-ear configuration to a right-ear configuration;

FIG. 4 is an enlarged perspective view showing the transition of the neckset speaker from a left-ear configuration to a right-ear configuration;

FIG. 11 is a perspective view of an alternative embodiment of the present invention in which the speaker is disengageable from the base and attaches to the user's ear.

FIG. 12 is a partially exploded view showing a speaker housing with an ear hook and with two separable parts in a separated condition.

FIG. 13 is a sectional view of the acoustical device of FIG. 12 in a re-assembled condition.

DETAILED DESCRIPTION OF EXAMPLES OF THE INVENTION

Figure 5:
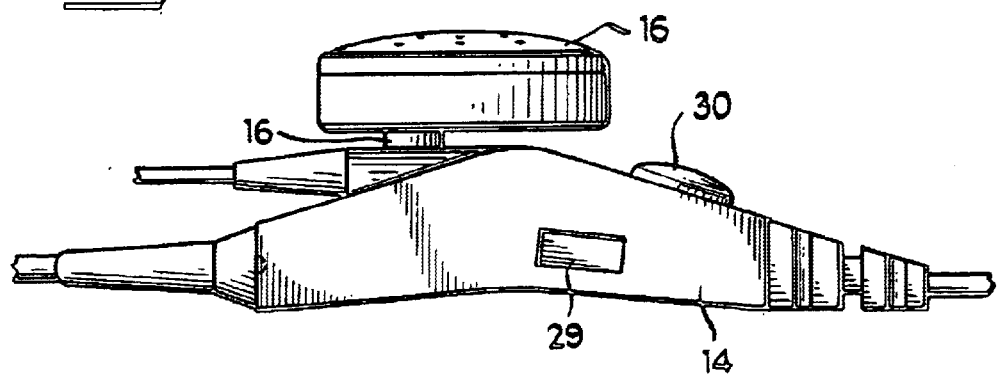
FIG. 5 is a side view showing the neckset speaker attached to the base of the present invention.

FIG. 1 shows a user 10 with a neckset 11 of the present invention around his neck. As shown in FIGS. 1 and 2, the resilient gripping band 12 defines a generally horizontal plane. The acoustical output device or speaker, which is housed in a speaker housing 16 mounted to a base 14, faces in a generally upward direction and is disposed just below the user's ear. An adjustable boom microphone support arm 18 extends from the front of the base 14. The microphone 20 is at the free end 21 of the arm 18. The base 14 includes a control 29 for adjusting the volume output of the speaker 16, and a button 30 that can be used as a push-to-talk, mute, on/off, or answer switch.

The distal end 22 of the resilient band 12 is enlarged to distribute the gripping forces applied to a wider area than a simple point load. A pad 28 faces inwardly to provide a cushion and the material of which the pad is made can be selected to enhance the frictional properties of the pad, which can add to the stability of the device based on the gripping action of the band 12. The support arm 18 is preferably made of bendable wire with memory, i.e. the boom microphone can be easily moved to various positions and will stay where it is moved. This allows the microphone 20 to be positioned to a location where it will not interfere with the user's mouth or chin, and yet allows the microphone 20 to be moved close to the user when the user must or wants to speak softly and still be heard.

FIG. 3 shows the manner in which the neckset 11 shown in FIGS. 1 and 2 is converted from the left-eared configuration (FIG. 1) to the right-eared configuration (FIG. 2). As shown in FIG. 3, when the band 12 is in the left-eared configuration (lower portion of FIG. 3), it may be rotated in the direction of arrow 40 about the axis 32 by 180 degrees to configure it for right-eared use (upper portion of FIG. 3).

FIG. 4 shows the manner in which the speaker housing 16 of the neckset 11 shown in FIGS. 1 and 2 is converted from the left-eared configuration to the right-eared configuration. As shown in FIG. 4, when the speaker housing 16 is in the left-eared configuration (top portion of FIG. 4) it may be rotated about a speaker axis 33 in the direction of arrow 43 by 180 degrees to configure it for the right-eared use (lower portion of FIG. 4).

FIG. 5 shows the speaker housing 16 attached to the base 14 of the neckset 11. As can be seen in FIG. 5, the speaker housing 16 is connected to the base 14 by a hollow support shaft (not shown in the figures) for speaker housing 16 that extends from a shoulder 15 formed on the underside of speaker housing 16. The hollow support shaft allows for a throughway for the wire to connect from the base 14 to the speaker or acoustical device inside the speaker housing 16. The shaft can be mechanically attached to the speaker housing and shoulder 15 by a screw at the end of the shaft that extends into the base 14. The shaft is in a tight friction fit with the shoulder 15, so that it can freely rotate between the left or right-ear configurations by manual movement. Since the shaft and shoulder are in a tight friction fit the speaker housing 16 is able to rest in any position along the path indicated by arrow 43 in FIG. 4.

Figure 6:
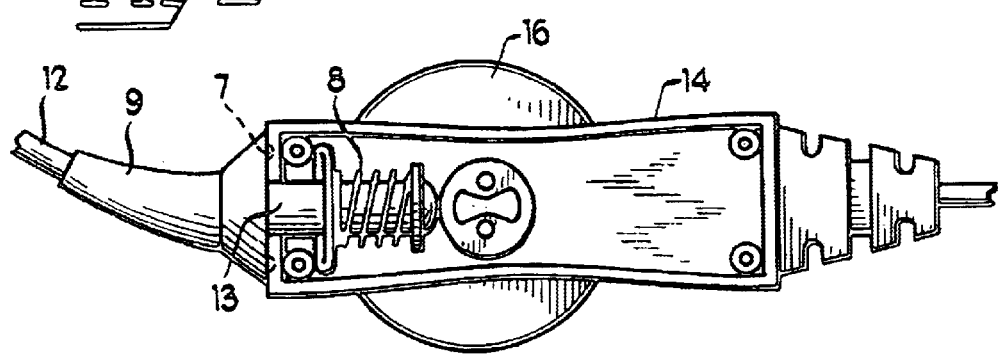
FIG. 6 is an enlarged bottom view of the base of the neckset of the present invention.
Figure 7:
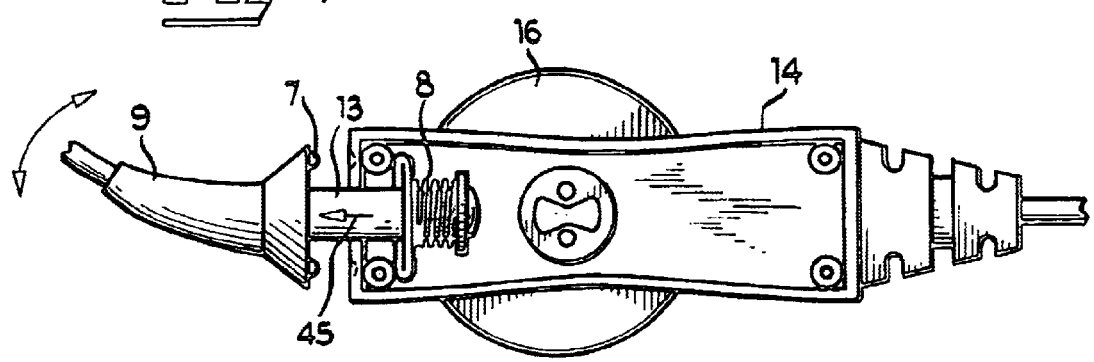
FIG. 7 is an enlarged bottom view of the base of the neckset of the present invention showing the disengagement of the band in order to effect transition from different ear configurations.

FIGS. 6 and 7 show the base 14 from the bottom to illustrate how the band 12 transforms from different ear configurations. As shown in FIG. 6, the band casing 9 encloses a portion of the band 12 closest to the base 14 and a post 13. In its resting position, the band casing 9 rests on two registration bumps 7. A spring 8 is attached on the post 13 on the opposite side of the registration bumps 7 from the band casing 9. As seen in FIG. 7, when the band 12 is pulled in the direction of arrow 45, it disengages the registration bumps 7 and can be turned and oriented 180 degrees.

Figure 8:
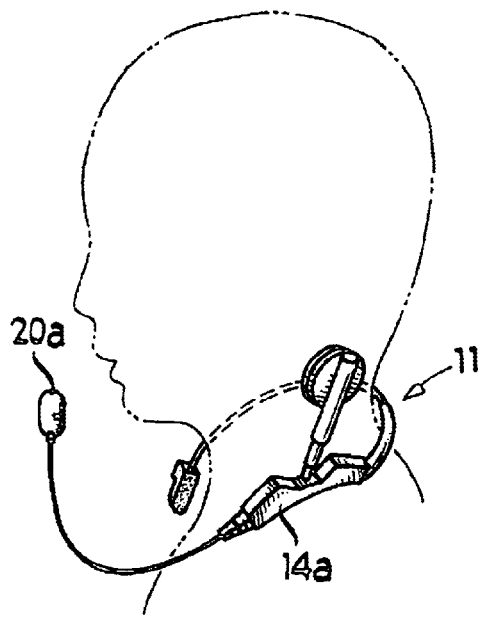
FIG. 8 is a perspective view of a user wearing an second version of the neckset of the present invention showing the position of the neckset on the user.
Figure 9:
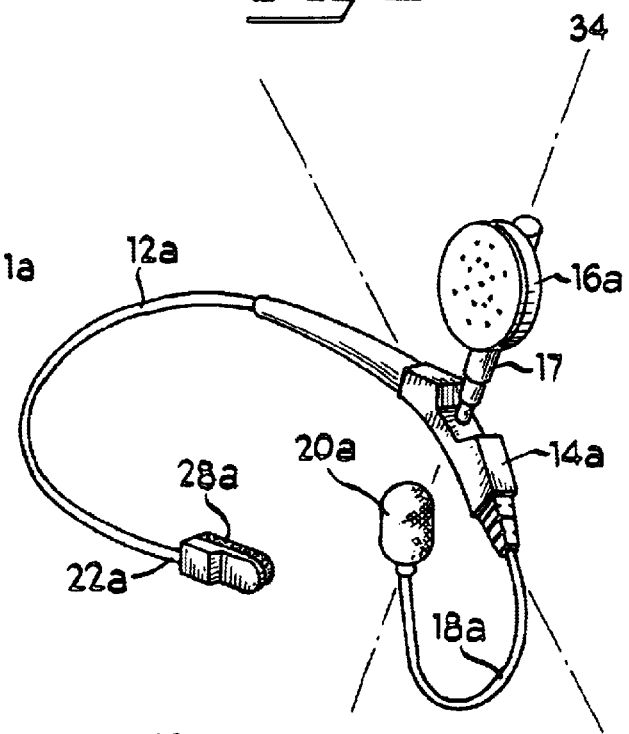
FIG. 9 is a perspective view of an alternative embodiment of the invention in which a speaker is movable with respect to a supporting base.
Figure 10:
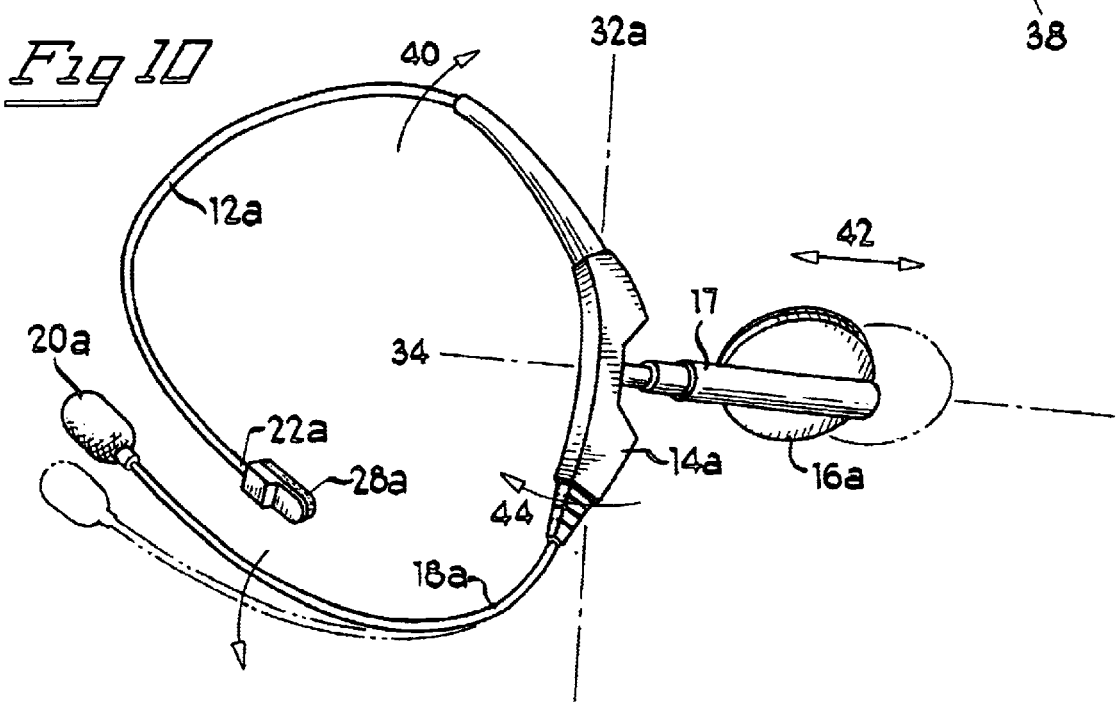
FIG. 10 is a perspective view of the neckset shown in FIGS. 4 and 5 showing ways in which the device may be adjusted and may be converted from one configuration to another.

FIGS. 8, 9 and 10 show another embodiment of the present invention. A suffix "a" is used on reference numerals to refer to components which correspond to those of the embodiment of FIGS. 1–3. The neckset 11a includes a speaker housing 16a which is movably and adjustably supported on a base 14a. As with the first example described above and shown in FIGS. 1–3, the example of FIGS. 8–10 includes a microphone 20a supported on a bendable and positionable arm 18a, which extends from a base 14a. Also, as with the first example, the neckset 11a includes a pad 28a on the distal end 22a of the band 12a.

The speaker housing 16a is supported on a telescoping speaker arm 17. The speaker arm 17 is itself pivotable about the longitudinal axis 38 of the base 14a. The direction in which the speaker housing 16a faces can be further adjusted by rotation of the speaker housing 16a about the axis 34 of the telescoping arm 17. The adjustability of the version of the invention shown in FIGS. 8 through 10 is that the speaker can be moved to a position very close to the user's ear. This would allow the volume of the output of the speaker or acoustical device to be set very low, for example in situations where several user's are working in close proximity and it is desired to minimize the extent to which one user may hear the output of another user's speaker.

FIG. 10, like FIG. 3, shows the manner in which the neckset 11a may be converted from being usable with one ear to being usable on the wearer's other ear. Rotating the gripping band 12a by 180 degrees about the axis 32a in the direction of the arrow 40 results in the left to right or right to left configuration change. Upward and downward adjustment of the speaker housing 16a is achieved by telescopic extension and retraction of the arm 17 in the direction of the arrow 42, along the speaker support axis 34. Movement of the speaker toward and away from the user's ear is further achieved by pivoting of the arm 17 about the base axis 32a in the direction of arrow 44.

FIG. 11 shows an alternative embodiment of the present invention in which the speaker housing can be disengaged from the base and automatically switched from loudspeaker mode to headphone mode in order to mount the speaker on the user's ear. A suffix "b" is used on reference numerals to refer to components which correspond to those of the embodiment of FIGS. 1–3. As shown in FIG. 11, the neckset 11b of the present invention rests on the neck, at or above the shoulders, as shown in FIGS. 1 and 2. A speaker housing 16b is supported by a base 14b and contains a speaker, a dual voice coil 23 and an attached pivotable ear hook 25. The speaker housing 16b has an upper and lower section, 26 and 27, respectively, with the upper section 26 containing the speaker itself and the lower section 27 forming a speaker housing part. The voice coil 23 is housed in the speaker housing lower section 27 just under the speaker housing upper section 26, and is retractable so that it moves with the speaker housing upper section 26 as it goes from the speaker housing 16b to a user's ear. The speaker housing upper section 26 can have an adjustable ear loop 25 attached to the outside so that it may be adjusted to fit a user's ear of differing physical characteristics. The upper section 26 of speaker housing is frictionally engaged with the lower section 27 in a clamshell arrangement. When the speaker housing upper section 26 is disengaged from the speaker housing lower section 27, the speaker or acoustical device automatically switches from loudspeaker mode to headphone mode by activation of a mechanical switch 36. The coil 23 utilizes different impedance and output ratings to allow for a single voice coil to switch from loudspeaker mode to headphone mode. As an alternative to the hardwired embodiment shown herein, the neckset 11b of the present invention may be configured in a wireless manner, such as by using radio frequency (RF) technology, to communicate with telecommunications devices without the need for the wires and plugs shown herein.

FIGS. 12 and 13 show the acoustic device of FIG. 11 in greater detail. One end of the ear hook 25 is held by a friction fit in a bore formed in an ear hook support block 37. The block 37 and the ear hook 25 along with the block 37 are rotatable about a connecting pin 45, to allow the separable upper section 26 to be used with either a left ear or a right ear. A switch 36 is mounted in the lower section 27 to automatically change the output from loudspeaker mode, when in the position shown in FIG. 13 to headphone mode when in the position shown in FIG. 12. The upper section 26 and lower section 27 are held together by a friction fit (although a snapping arrangement may also be used) in which a disc 47 extending from the upper section 26 fits into a cylindrical portion 49 of the interior of the lower section 27. A speaker 50 is housed within the upper section 26, and is connected by wiring within the coil 23 to the switch 36, from which there is a connection into the base (not shown in FIGS. 12 and 13) and from there to a plug and into a phone or other telecommunications device.

Although the invention has been described in considerable detail with reference to certain embodiments or examples, one skilled in the art will appreciate that the present invention can be practiced by other embodiments with variations, modifications and improvements to what is shown and described above. The examples shown have been presented for the purpose of illustration and should not be used to limit the breadth or scope of the inventions for which claims are made as set forth below. Therefore, the spirit and scope of the appended claims should not be limited to or by the description of the embodiments illustrated herein.

What is claimed is:

1. A personal wearable communication system, comprising:
   a base,
   an acoustic output device carried by said base;
   a resilient gripping band carried by and extending laterally from said base, said gripping band being curved and having a length whereby a distal end of said band and said base are positionable so as to gently engage generally opposite sides of a user's neck and said acoustic output device rests below a user's ear; and
   a microphone carried by an adjustably positionable support arm, said support arm extending from said base.

2. A personal wearable communication system in accordance with claim 1 wherein:
   said gripping band is moveable rotatably about said base between to two operable and generally stable positions, a first stable position in which said distal end of said band is disposed on one side of said base, and a second stable position in which said distal end of said band is disposed on an opposite side of said base.

3. A personal wearable communication system in accordance with claim 1 wherein:
   said distal end of said band is enlarged, and includes a pad facing said base for distributing gripping forces applied by said band.

4. A personal wearable communication system in accordance with claim 1 wherein:
   said base includes an external pushbutton switch and a volume control for adjusting the output of said acoustic output device, said pushbutton switch being useable in a push-to-talk mode in a two-way communication system.

5. A personal wearable communication system in accordance with claim 1 wherein:
   said acoustic output device is a speaker, said speaker being supported on said base, and facing in a predetermined direction that is generally normal to a plane defined by said band, said speaker being rotatable between a first position in which said speaker extends outwardly with respect to one side of said base and a second position in which said speaker extends outwardly with respect to an opposite side of said base.

6. A personal wearable communication system in accordance with claim 5 wherein:
   said system is configurable to two alternative configurations, a first configuration for use with one of a user's ears in which said band is positioned so as to extend from said base to a first side of said base, and said acoustic output device is positioned to extend from a second opposite side of said base, and a second configuration for use with the other of said user's ears in which said band is positioned so as to extend from said base to said second opposite side of said base, and said acoustic output device is positioned to extend from said first side of said base.

7. A personal wearable communication system in accordance with claim 1 wherein: said acoustic output device is connected to said base by a telescopic arm such that said acoustic device may be move by extension of said arm to positions in which the distance between said base and said acoustic device varies.

8. A personal wearable communication system in accordance with claim 7 wherein: said acoustic output device is rotatable about an axis of said telescopic arm to positions which are generally opposite from each other, whereby said acoustic device is positionable to be readily useable by either one of a user's two ears.

9. A personal wearable communication system in accordance with claim 8 wherein: said acoustic output device includes separable upper and lower sections, said lower section being rotatably carried by said base, and said upper section having a pivotable ear hook, said upper section being electrically connected to said lower section by a retractable coil wire stowable in a space defined by said upper and lower sections when in an unseparated condition, said upper and lower sections being held in said unseparated position by a friction fit.

10. A personal wearable communication system in accordance with claim 9 wherein:
    a switch carried by said acoustic output device automatically switches a speaker carried by said upper section from a loudspeaker mode to a headphone mode upon separation of said sections from each other.

11. A personal wearable communication system, comprising:
    a base,
    a speaker housing with a speaker inside, said speaker housing carried by said base;
    a resilient gripping band extending laterally from said base, said gripping band being curved such that a distal end of said band and said base are disposed at opposite ends of said band and are positionable so as to gently engage generally opposite sides of a user's neck and said speaker housing rests below a user's ear; and
    a microphone carried by an adjustably positionable support arm extending from said base,
    said gripping band being moveable rotatably about said base between to two operable and generally stable positions, a first stable position in which said distal end of said band is disposed on one side of said base, and a second stable position in which said distal end of said band is disposed on an opposite side of said base,
    said speaker housing being arranged such that said speaker is facing generally away from a plane defined by said band, said speaker being moveable between a first speaker position in which said speaker extends laterally outwardly with respect to one side of said base and in a direction away from a side of said base around which said band extends when said band is in said first stable position, and a second speaker position in which said speaker extends laterally outwardly with respect to an opposite side of said base and in a direction away from a side of said base around which said band extends when said band is in said second stable position.

12. A personal wearable communication system in accordance with claim 11 wherein: said speaker housing is connected to said base by a telescopic arm such that said speaker housing may be moved by extension of said arm to a positions in which the distance between said base and said speaker housing varies.

13. A personal wearable communication system in accordance with claim 12 wherein: said speaker housing is rotatable about an axis of said telescopic arm to positions which are generally opposite from each other, whereby said acoustic device is positionable to be readily useable by either one of a user's two ears.

14. A personal wearable communication system in accordance with claim 11 wherein: said speaker housing includes separable upper and lower sections, said lower section being rotatably carried by said base, and said upper section having a pivotable ear hook capable of being positioned around said upper section in two opposite clockwise directions, said upper section being connected by a retractable coil wire stowable in a space defined by said upper and lower sections when in an unseparated condition, said upper and lower sections being held in said unseparated position by a friction fit.

15. A personal wearable communication system in accordance with claim 11 wherein:
   a switch carried by said speaker housing automatically switches said speaker from a loudspeaker mode to a headphone mode upon separation of said sections from each other.

16. A personal wearable communication system, comprising:
   a base,
   a speaker housing with a speaker inside, said speaker housing carried by said base;
   a resilient gripping band extending laterally from said base, said gripping band being curved such that a distal end of said band and said base are disposed at opposite ends of said band and are positionable so as to gently engage generally opposite sides of a user's neck and said speaker housing rests below a user's ear; and
   a microphone carried by an adjustably positionable support arm extending from said base,
   said speaker housing being arranged such that said speaker is facing generally away from a plane defined by said band.

17. A personal wearable communication system in accordance with claim 16 wherein: said speaker housing includes separable upper and lower sections, and said upper section having an ear hook extending around said upper section, said upper section being connected by a retractable coil wire stowable in a space defined by said upper and lower sections when in an unseparated condition, said upper and lower sections being held in said unseparated position by a friction fit.

18. A personal wearable communication system in accordance with claim 16 wherein:
   a switch carried by said speaker housing automatically switches said speaker from a loudspeaker mode to a headphone mode upon separation of said sections from each other.

* * * * *